US012497227B2

(12) United States Patent
Schwartz

(10) Patent No.: US 12,497,227 B2
(45) Date of Patent: Dec. 16, 2025

(54) CONTAINER FOR CONSUMABLE SUBSTANCES WITH INTEGRATED UTENSIL

(71) Applicant: Gabriel William Adler Schwartz, North Hampton, NH (US)

(72) Inventor: Gabriel William Adler Schwartz, North Hampton, NH (US)

(73) Assignee: Gabriel William Adler Schwartz, North Hampton, NH (US)

( * ) Notice: Subject to any disclaimer, the term of this patent is extended or adjusted under 35 U.S.C. 154(b) by 112 days.

(21) Appl. No.: 18/140,110

(22) Filed: Apr. 27, 2023

(65) Prior Publication Data
US 2023/0399160 A1    Dec. 14, 2023

Related U.S. Application Data

(60) Provisional application No. 63/351,889, filed on Jun. 14, 2022.

(51) Int. Cl.
*B65D 77/08*    (2006.01)
*A47G 21/04*    (2006.01)

(52) U.S. Cl.
CPC ............. *B65D 77/08* (2013.01); *A47G 21/04* (2013.01)

(58) Field of Classification Search
CPC .. B65D 77/08; B65D 2221/00; B65D 77/245; A47G 21/04
See application file for complete search history.

(56) References Cited

U.S. PATENT DOCUMENTS

| | | | |
|---|---|---|---|
| 1,000,178 A | 8/1911 | Kahl | |
| 3,116,152 A | 12/1963 | Smith | |
| 3,154,418 A | 10/1964 | Lovell et al. | |
| 3,356,095 A * | 12/1967 | Tylle | A46B 11/0003 222/106 |
| 3,545,604 A * | 12/1970 | Gunther, Jr. | B65D 77/283 206/217 |
| 3,799,914 A * | 3/1974 | Schmit | B65D 75/008 426/115 |
| 4,648,506 A | 3/1987 | Campbell | |
| 4,806,021 A * | 2/1989 | Koudstaal | B65D 77/28 206/217 |

(Continued)

*Primary Examiner* — Orlando E Aviles
*Assistant Examiner* — Jenine Pagan
(74) *Attorney, Agent, or Firm* — Argus Intellectual Enterprise, LLC; Jordan Sworen; Daniel Enea

(57) ABSTRACT

A container for consumable substances with integrated utensil is provided. The container includes a container housing forming a first compartment and a second compartment disposed in a generally stacked configuration, wherein the first compartment can store a single or multi-serving of an edible substance. The integrated utensil is housed within the second compartment, wherein a head of the utensil extends past an end of the container housing and is enclosed by a removable utensil packing housing. A handle end of the utensil extends and remains within the second compartment. The edible substance fills the head of the utensil without removal of the handle of the utensil from the second compartment. A utensil head housing is coupled to the container housing such that separation of the utensil head housing from container housing simultaneously causes the utensil head to be revealed and the first compartment to open.

19 Claims, 6 Drawing Sheets

(56) References Cited

U.S. PATENT DOCUMENTS

| | | | |
|---|---|---|---|
| 4,830,222 A | 5/1989 | Read | |
| 4,880,409 A * | 11/1989 | Bergkvist | A61J 7/0053 |
| | | | D24/116 |
| 4,888,188 A * | 12/1989 | Castner, Sr. | B65D 81/3484 |
| | | | 222/146.2 |
| 5,937,617 A * | 8/1999 | Yeager | B65D 77/283 |
| | | | 206/217 |
| 6,071,523 A | 6/2000 | Mehta et al. | |
| 7,314,328 B2 * | 1/2008 | Liberatore | B65D 35/38 |
| | | | 401/265 |
| 2001/0045374 A1 | 11/2001 | Selker | |
| 2005/0025560 A1 * | 2/2005 | Liberatore | B65D 83/768 |
| | | | 401/265 |
| 2013/0047446 A1 | 2/2013 | Leffler | |
| 2016/0001967 A1 | 1/2016 | Franzén et al. | |
| 2019/0337701 A1 * | 11/2019 | Nash | B65D 75/008 |
| 2023/0389737 A1 * | 12/2023 | Rodriguez | B65D 83/76 |

* cited by examiner

CONTAINER FOR CONSUMABLE SUBSTANCES WITH INTEGRATED UTENSIL

CROSS REFERENCE TO RELATED APPLICATION

This application claims the benefit of U.S. Provisional Application No. 63/351,889 filed on Jun. 14, 2022; the above identified patent application is herein incorporated by reference in its entirety.

BACKGROUND OF THE INVENTION

The present invention relates to a container for consumable substances. More specifically, the present invention relates to a container for consumable substances with an integrated utensil housed within the container.

Single use and multi-use containers are a convenient way to package a variety of foodstuff and other edible substances, such as for condiments, spreads, and the like. Conventionally, the packaging for these substances can be torn or otherwise removed to reveal the foodstuff inside the container. A separate utensil is often needed to spread or otherwise eat the foodstuff. The separate utensil can include a disposable utensil, such as plastic spoons and forks, or a re-usable utensil. However, the use of separate, disposable utensils often leads to waste and are inconvenient for users who need to carry both the food and utensils separately. Re-usable utensils require cleaning of the utensil once finished with its use.

Some packaging exist that use the combination of a container and utensil in a single package, such having the utensil secured or placed to the exterior of the container. However, these utensils can become loose or detach from the container and lost, causing the user to find another means of eating the foodstuff. Additionally, these packaging systems are limited in their capacity to store larger quantities of food and can be difficult to use effectively. Other containers include a spout that allow a user to pour the foodstuff directly into their mouth. However, many people prefer to eat with a utensil rather than suck a substance from a pouch or other container.

The deficiencies of these existing systems have led to a demand for a more efficient and convenient solution for the storage and consumption of edible substances. The invention of a container with an integrated utensil addresses these deficiencies by providing a compact, secure, and environmentally-friendly system that allows for the storage and consumption of larger quantities of food with an attached utensil that is readily accessible. Therefore, there exists a need for a container comprising a fully integrated utensil that is unable to separate therefrom while providing a convenient way to transfer the foodstuff from the container to the utensil. The present invention provides a container having a first compartment adapted to store a single or multi-serving of an edible substance and a second compartment that houses a utensil, such that the edible substance from the first compartment can be received on the utensil of the second compartment.

In light of the devices disclosed in the known art, it is submitted that the present invention substantially diverges in design elements and methods from the known art and consequently it is clear that there is a need in the art for an improvement for a container for consumable substances with integrated utensil. In this regard the instant invention substantially fulfills these needs.

SUMMARY OF THE INVENTION

In view of the foregoing disadvantages inherent in the known types of containers for consumable substances with integrated utensil now present in the known art. The present invention provides a new container for consumable substances with integrated utensil, wherein the same can be utilized for providing a single or multi-serving of an edible substance stored in a first compartment of the container and a utensil stored within a second compartment of the container such that the edible substance from the first compartment can be received on the utensil of the second compartment.

It is an objective of the present invention to provide an embodiment of the container for consumable substances with integrated utensil comprising a container housing forming a first compartment and a second compartment disposed in a generally stacked configuration, wherein the first compartment is adapted to store a single or multi-serving of an edible substance and the second compartment houses the utensil such that the edible substance from the first compartment can be received on the utensil of the second compartment.

It is another objective of the present invention to provide an embodiment of the container for consumable substances with integrated utensil wherein a head of the utensil extends past an end of the container housing and is enclosed by a removable utensil packing housing and a handle end of the utensil remains within the second compartment. The edible substance of the first compartment is adapted to fill the head of the utensil without removal of the handle of the utensil from the second compartment.

It is yet another objective of the present invention to provide an embodiment of the container for consumable substances with integrated utensil. A utensil head housing is coupled to the container housing such that separation of the utensil head housing from container housing simultaneously causes the utensil head to be revealed and the first compartment to open.

It is yet another objective of the present invention to provide a container and utensil together designed to be a convenient, wholesome, and clean way of fulfilling nutritional and dietary needs without the need for food preparation, container assembly, or cleaning of utensils or containers.

The benefits of the present invention include a more efficient and convenient solution for the storage and consumption of edible substances, reducing waste and improving the user experience. The integrated utensil also provides a more secure and user-friendly experience, reducing the risk of spillage and improving the overall usability of the container. Overall, the invention provides a more sustainable and practical solution for the storage and consumption of edible substances.

It is therefore an object of the present invention to provide a new and improved container for consumable substances with integrated utensil that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows an exploded view of a first embodiment of the container for consumable substances with integrated utensil.

DETAILED DESCRIPTION OF THE INVENTION

Figure 1:
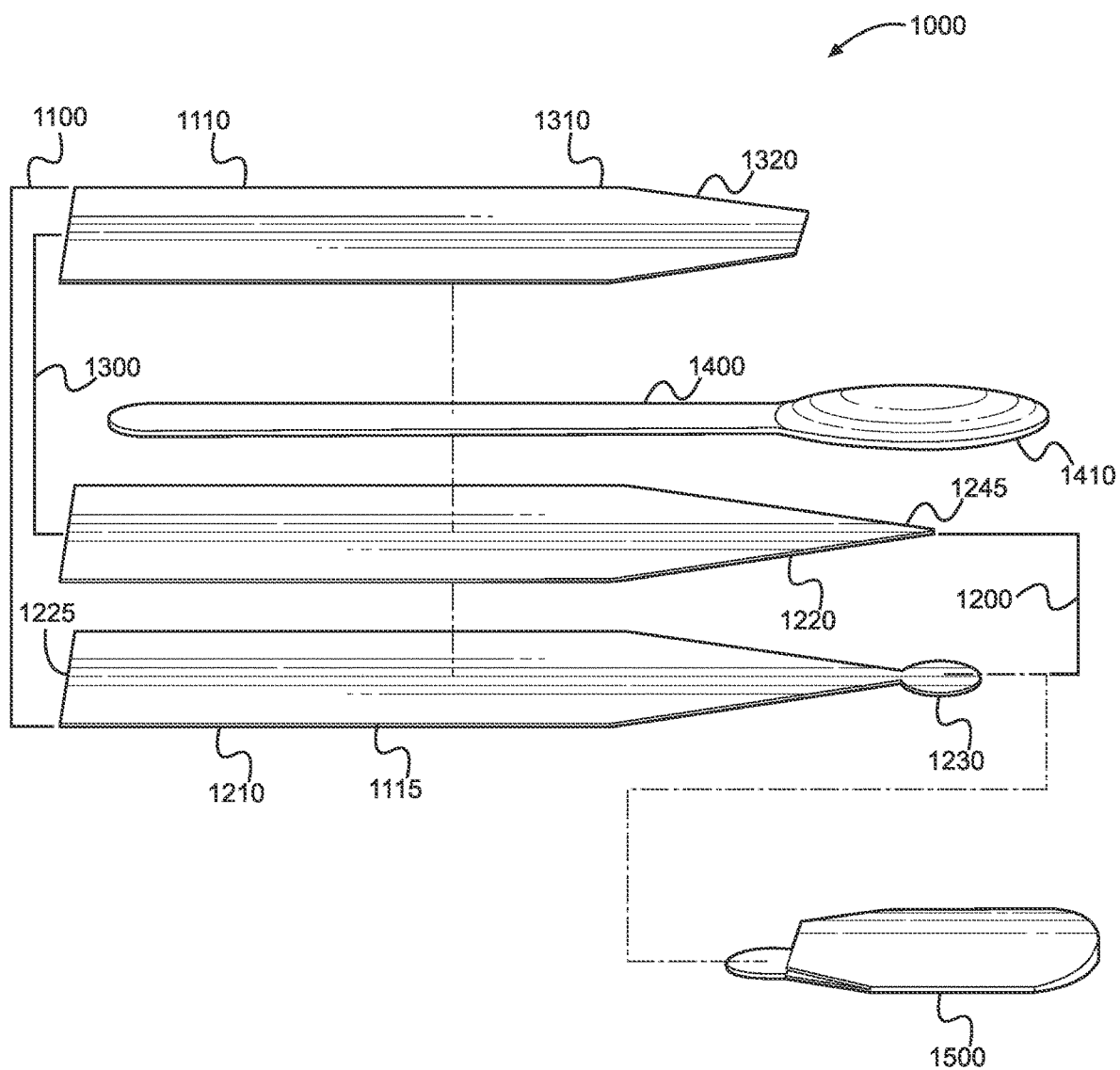

Reference is made herein to the attached drawings. Like reference numerals are used throughout the drawings to depict like or similar elements of the container for consumable substances with integrated utensil. For the purposes of presenting a brief and clear description of the present invention, the preferred embodiment will be discussed as used for providing a single or multi-serving of an edible substance stored in a first compartment of the container and a utensil stored within a second compartment of the container such that the edible substance from the first compartment can be received on the utensil of the second compartment. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

Referring now to FIG. 1, there is shown an exploded view of a first embodiment of the container for consumable substances with integrated utensil. The container for consumable substances with integrated utensil 1000 comprises a plurality of layers that are sealed together to form compartments to securely retain an edible substance and a utensil within the container. In the illustrated embodiment, the present invention comprises a container housing 1100 forming a first compartment 1200 configured to store one or more servings of the edible substance and a second compartment 1300 that houses the utensil 1400. A utensil head housing 1500 removably covers a head 1410 of the utensil 1400 and retains an end of the first compartment 1200 and second compartment 1300 in an unopened state. The unopened state is defined as each compartment having no openings to an exterior.

In the illustrated embodiment, the first compartment 1200 is formed by a first layer 1210 and a second layer 1220 that are secured together along a perimeter, wherein the second compartment 1300 is formed by the second layer 1220 and a third layer 1310 that are secured together along a perimeter. Each layer comprises a generally planar, flat rectangular shaped body having a tapered first end 1320. In the illustrated embodiment, the first layer 1210 comprises a tapered first end 1215 that terminates in a circular tab 1230, whereas the second layer 1220 tapers to a point 1245. The point 1245 aligns within the circular tab 1230 and a seal is formed therebetween sealing the edible substance within the first compartment 1200. In the illustrated embodiment, the circular tab 1230 is fastened to an interior surface of the utensil head housing 1500, wherein the connection serves to break the seal between the circular tab 1230 and the point 1245 when the utensil head housing is separated from the container 1100. In some embodiments, the circular tab 1230 is used as a guide for centering and aligning the head 1410 of the utensil 1400 relative to the container housing 1100.

In the illustrated embodiment, the third layer 1310 also comprises a tapered first end 1320 similar to the first and second layers 1210, 1220, but the tapered end of the third layer 1310 is blunt having a linear edge parallel to the edge of an opposing second end 1225 of the layers. The third layer 1310 comprises a blunt end to prevent an unnecessary obstruction between the head 1410 of the utensil 1400 and the utensil head housing 1500.

In the illustrated embodiment, the first layer 1210 forms an exterior side of the container housing 1100, and the second layer 1220 extends through an interior volume of the container housing 1100 that separates the first compartment 1200 from the second compartment 1300. In the illustrated embodiment, the second layer 1220 comprises an exterior perimeter that is coextensive with an exterior perimeter of the first layer 1210 and the third layer 1310, such that each layer comprises a same width, wherein the width is measured as the distance between a pair of lateral sides 1110, 1115. The second end 1225 of each layer 1210, 1220, 1310 terminate at approximately a same location and form substantially linear edge perpendicular to the lateral sides 1110, 1115 of the container housing 1100. In alternate embodiments, the layers comprise differing lengths and widths from one another. For example, the length of the second end of the first layer extends beyond the edge of the second and third layers to form an extended exterior for displaying information to a user, such as ingredient information about the edible substance contained within the container. In other embodiments, the layers comprise any suitable shape configured to overlay and secure to one another to form a compartment.

Figure 2:
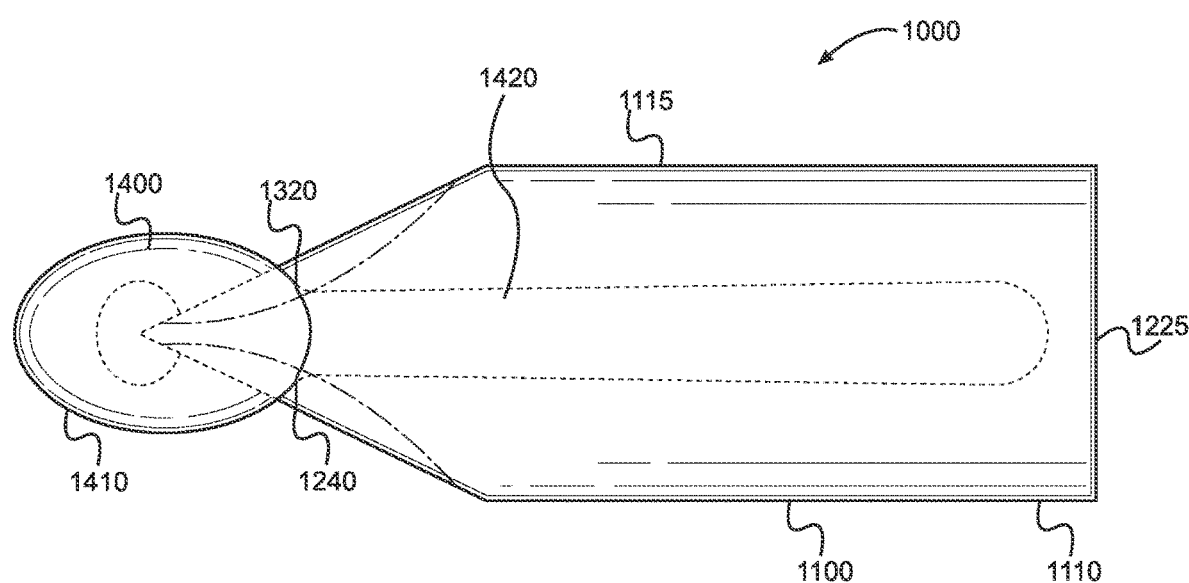
FIG. 2 shows a semi-transparent view of a first embodiment of the container for consumable substances with integrated utensil.
Figure 3:
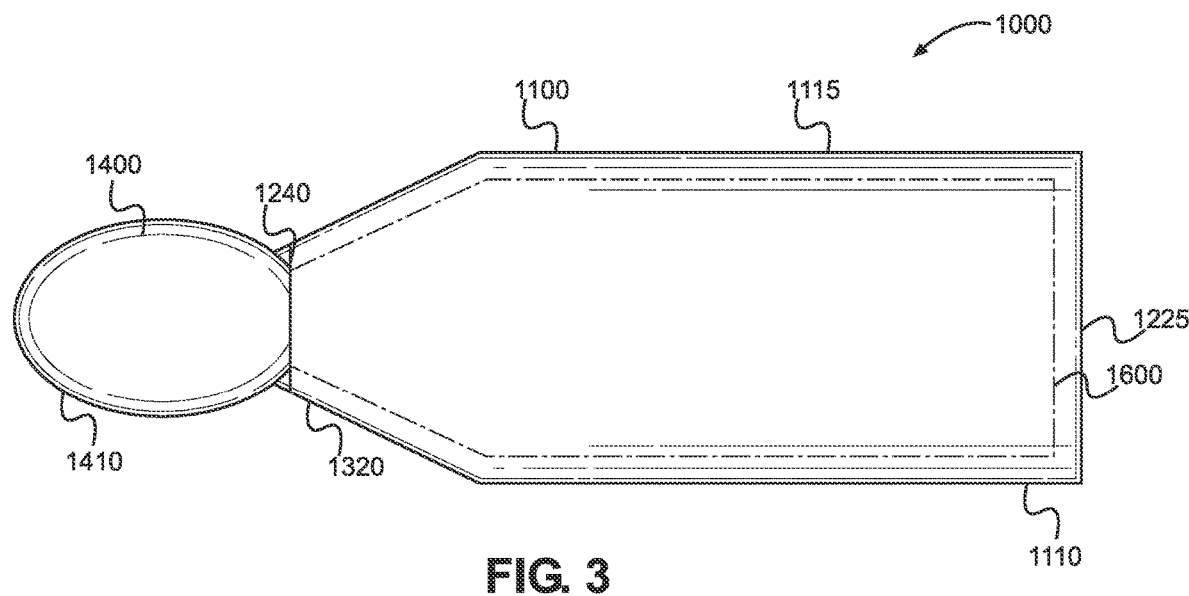
FIG. 3 shows a top planar view of the first embodiment of the container for consumable substances with integrated utensil.

Referring now to FIGS. 2 and 3 there is shown a semi-transparent view and a top planar view of a first embodiment of the container for consumable substances with integrated utensil respectively. In the illustrated embodiment, the layers of the container housing 1100 and the utensil head housing are composed of a material configured to be sealed to each other, such as a metalized heat seal material that allows the layers to be sealed to one another when a heat source is applied thereto. For example, one or more of the layers is composed of any suitable material including but not limited to: metalized heat-seal bags, aluminum foil, cellophane, cloth, fiberglass, mylar, polyethylene, polypropylene, etc. In the illustrated the layers are secured to one another by heat-sealing the second layer to both the first layer and third layer along a perimeter thereof. The heat seal is configured to provide an airtight, watertight, or moisture-resistant seal. In alternate embodiments, the layers and the utensil head housing are sealed to one another in any suitable manner.

In the illustrated embodiment, the seal between the first and second layers is formed along an entire perimeter of the container housing 1100. The seal along the lateral sides 1110, 1115 of the tapered first end 1320 forms a bottle neck shape adapted to guide the edible substance from the second end 1225 of the first compartment to the first end 1320. The first end 1320 is configured to form an opening 1240 once the utensil head housing is separated from the container housing, to allow the edible substance to flow therethrough. The sealing mark 1600 is shown with a dash-dot line in FIG. 3.

In the illustrated embodiment, the utensil 1400 is substantially flat and comprises a handle 1420 that is configured to remain in an interior volume of the second compartment and the head 1410 that extends from the second compartment. In the illustrated embodiment, the utensil 1400 is positioned within the second compartment, such that a rear side of the handle 1420 rests on the third layer and a front side of the handle 1420 faces the second layer. In some embodiments, the handle 1420 is secured to either or both the second layer and third layer via any suitable fastener, such as an adhesive. In the illustrated embodiment, the blunt tapered end of the third layer is adhered to the backside of the utensil via an adhesive. In the shown embodiment, the utensil 1400 is a spoon. However, in alternate embodiments, the utensil comprises any suitable configuration, such as a fork, knife, and the like. In the illustrated embodiment, the head 1410 of the utensil 1400 comprises a concave portion that faces the first compartment such that the spoon is aligned to receive the edible substance therein when the substance passes through the opening of the first compartment.

In the illustrated embodiment, to form the first and second compartment, once the handle of the utensil 1400 is disposed or otherwise secured between the second and third layers, the lateral sides 1110, 1115 of all three layers and the first end of the first compartment, are sealed together along the perimeter. The first end of the first and second layers are sealed together, while the first end of second compartment (formed by the second and third layers) remain unsealed. The unsealed first end of the second compartment provides an opening to receive the utensil therethrough. At this point in the sealing process, the first compartment is empty, meaning that no edible substance is contained therein, and the second end of each compartment remains open and unsealed. The edible substance is then placed between the first and second layers, filling the first compartment. After the first compartment has been filled with the edible substance, the second ends 1225 are sealed to enclose the edible substance and the utensil within the container housing 1100. In this configuration, the first compartment is stacked above the second compartment and the head 1410 of the spoon extends beyond the blunt tapered end of the third layer, wherein the handle remains concealed within the second compartment. In the illustrated embodiment, the utensil head housing is then sealed to the container housing to form the assembled container for consumable substances with integrated utensil.

Figure 4:
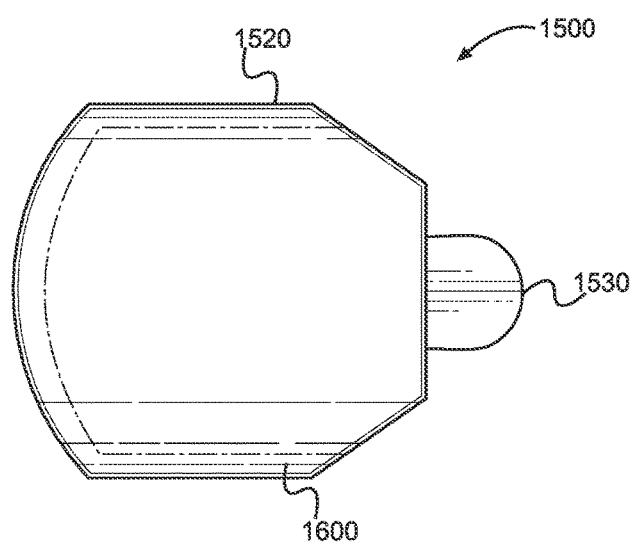
FIG. 4 shows a top planar view of a utensil head housing of the container for consumable substances with integrated utensil.
Figure 5:
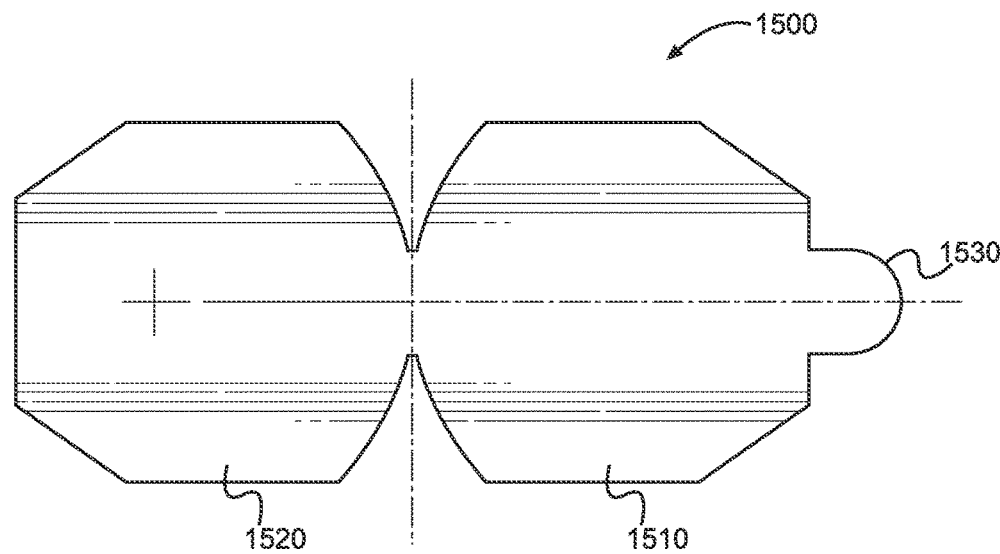
FIG. 5 shows a top planar view of a utensil head housing, in an unfolded configuration, of the container for consumable substances with integrated utensil.

Referring now to FIGS. 4 and 5, there are shown top planar views of the utensil head housing of the container for consumable substances with integrated utensil in a folded and unfolded configuration, respectively. In the illustrated embodiment, the utensil head housing 1500 is composed of a clam-shell shaped wrapping having a first side 1510 and a second side 1520 adapted to fold around the utensil head and tapered ends of the first and second compartments. A lift tab 1530 extends from the first side 1510 of the utensil head housing 1500 and can be manipulated by the user to unseal or otherwise open the tapered end of the container housing, revealing the utensil head and the opening of the first compartment. In the illustrated embodiment, the lift tab 1530 is composed of a rigid material, such as plastic, which is more rigid than the remainder of the utensil head housing 1500. A portion of the lift tab 1530 extends within the interior of the utensil head housing 1500 and is adhered directly to the circular tab of the first layer. In the illustrated embodiment, the circular tab is composed of the same material as the first layer. However, in alternate embodiments, the circular tab is composed of a different material intended to form a stronger connection with the lift tab.

Once the utensil head housing 1500 is opened, the fastened connection between the lift tab 1530 and the circular tab forces the seal between the circular tab and the point of the second layer to break. In the illustrated embodiment, the seal is broken because the circular tab is torn from the first layer, along with the lift tab 1530, as the lift tab is pulled further away from the container.

A perimeter of the utensil head housing 1500 is sealed to join the first and second sides 1510, 1520 to one another. The utensil head housing 1500 is then positioned over the tapered ends and the head of the utensil, forming a seal therewith as indicated by the sealing mark 1600 shown with a dash-dot line. The utensil head housing 1500 is coupled to the container housing such that separation of the utensil head housing from container housing simultaneously causes the utensil head to be revealed and the first compartment to open. Thus, when the utensil head housing 1500 is torn or otherwise separated from the container housing, not only is the utensil head revealed, but the first compartment is opened to allow access to the edible substance contained therein via the opening.

Figure 6A:
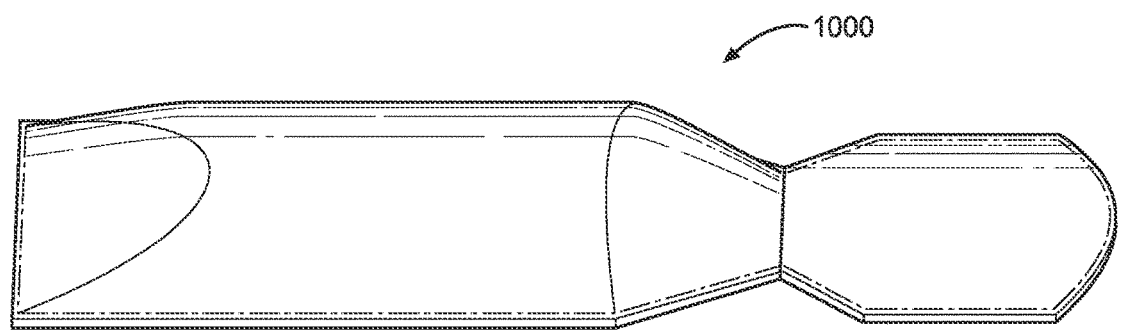
FIG. 6A shows a perspective view of a first embodiment of the container for consumable substances with integrated utensil.
Figure 6B:
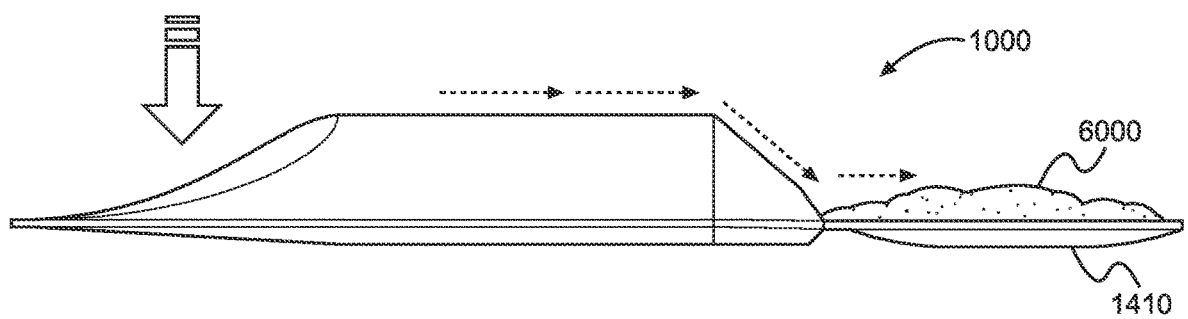
FIG. 6B shows a perspective view of a first embodiment of the container for consumable substances with integrated utensil, wherein a utensil head housing is removed.

Referring now to FIGS. 6A and 6B, there are shown perspective views of a first embodiment of the container for consumable substances with integrated utensil. In operation, the user pulls on the lift tab to reveal the utensil head 1410 and the opening of the first compartment. In the illustrated embodiment, the container 1000 and edible substance 6000 are malleable such that the user can apply force to the first compartment to push the edible substance through the opening of the first compartment and onto the head of the spoon. Once finished, the container for consumable substances with integrated utensil can be disposed of. The joining of a container and utensil together is designed to be a convenient, wholesome, and clean way of fulfilling nutritional and dietary needs without the need for food preparation, container assembly, or cleaning of utensils or containers.

For example, the container for consumable substances with integrated utensil can comprise a multi-serving volume of peanut butter, margarine, jelly, cream cheese, or other spreadable condiment, wherein the utensil is a knife. In other embodiments, the container for consumable substances with integrated utensil can comprise a single serving volume of yogurt, applesauce, and the like, wherein the utensil is a spoon. In yet other embodiments, the edible substance includes medication in metered dosages. In some embodiments, the utensil head housing is configured to be removably secured to the container housing after initial removal thereof.

Figure 7:
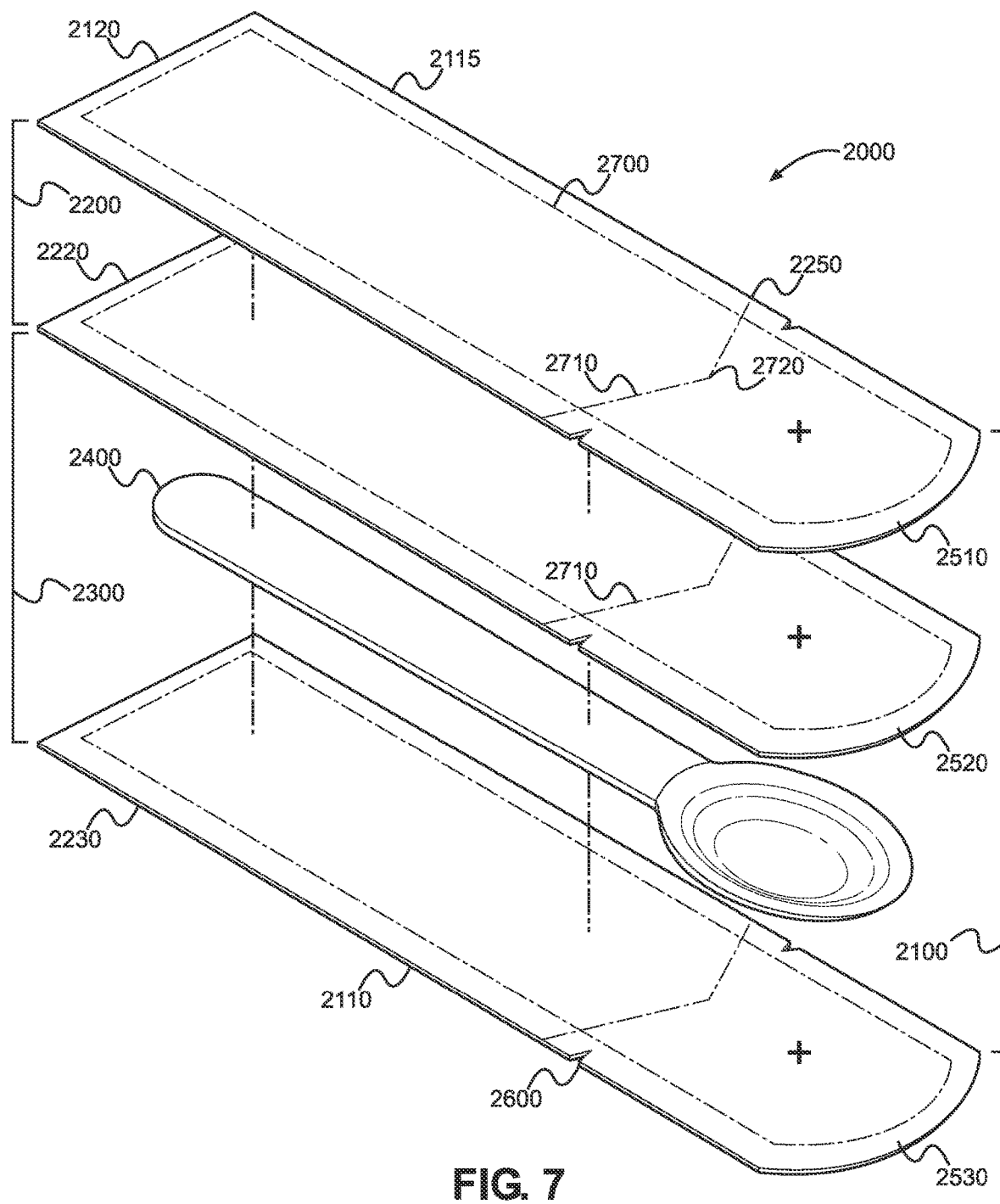
FIG. 7 shows an exploded view of a second embodiment of the container for consumable substances with integrated utensil.
Figure 8:
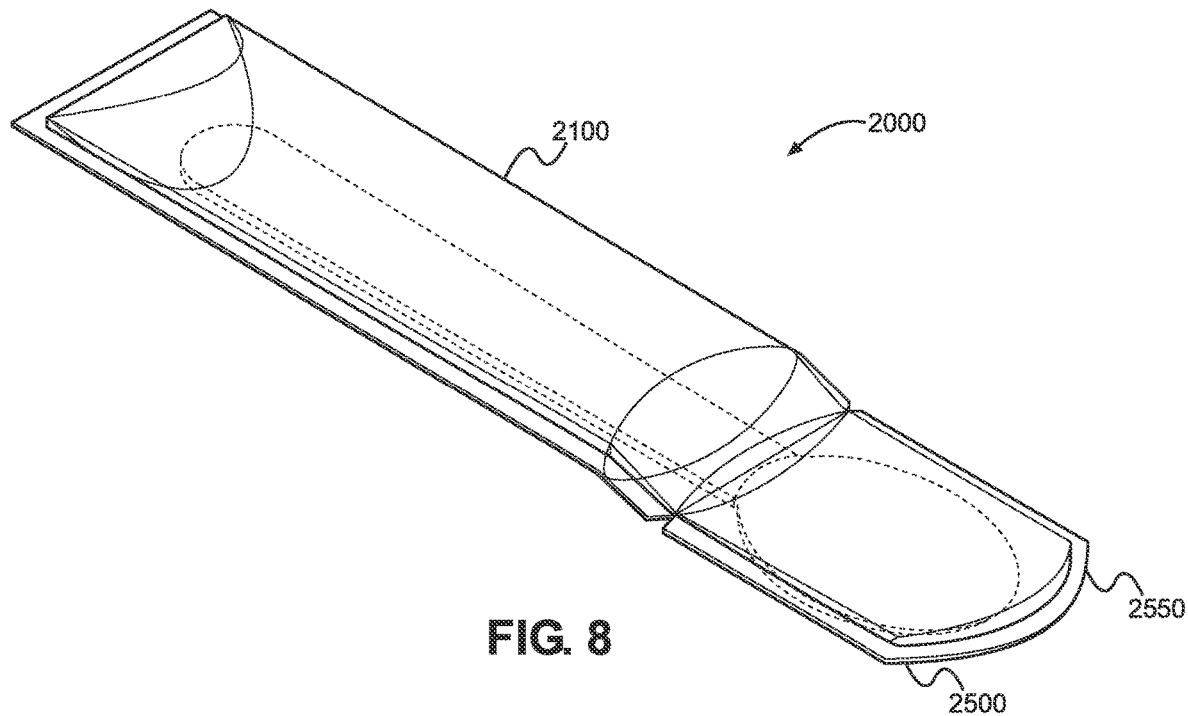
FIG. 8 shows a perspective view of a second embodiment of the container for consumable substances with integrated utensil.
Figure 9:
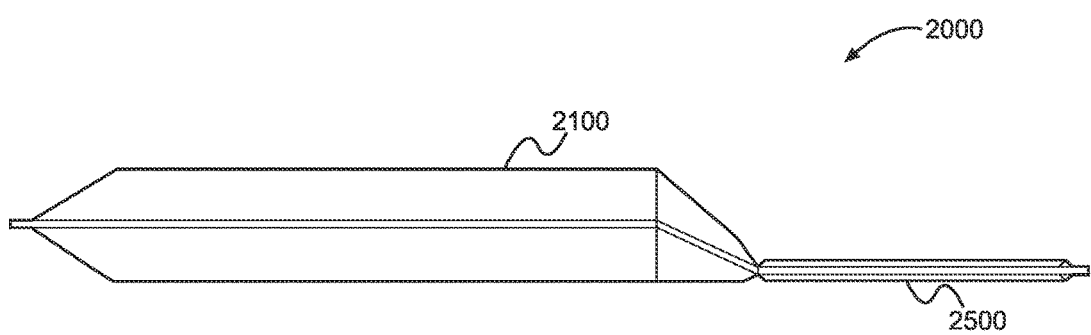
FIG. 9 shows a side view of a second embodiment of the container for consumable substances with integrated utensil.

Referring now to FIGS. 7-9, there are shown views of a second embodiment of the container for consumable substances with integrated utensil. In alternate embodiments, the container for consumable substances with integrated utensil 2000 comprises a utensil head housing 2500 having a plurality of layers. The layers of the container housing 2100 form the first and second compartments 2200, 2300 as previously described in the first embodiment. However, instead of the first ends of the layers tapering, the first end 2250 of each layer of the container housing 2100 terminates in a layer of the utensil head housing 2500. In the illustrated embodiment, the container housing 2100 comprises a first layer 2120 having a first end that terminates in the first layer 2510 of the utensil head housing 2500, a second layer 2220 having a first end that terminates in the second layer 2520 of the utensil head housing 2500, and a third layer 2230 having a first end that terminates in the third layer 2530 of the utensil head housing 2500.

In the illustrated embodiment, the first, second, and third layers of both the container housing 2100 and utensil head housing 2500 are identical to each other having coplanar perimeters to one another. The exterior end 2550 of the utensil head housing 2500 is rounded to correspond to the general rounded shape of a spoon utensil 2400 disposed within the second compartment 2300.

The layers are sealed to one another along the entire perimeter of the container housing 2100 and the utensil head housing 2500 as indicated by the seal marking 2700. A second seal 2710 is formed between the lateral sides 2110, 2115 of the first and second layers 2120, 2220 to prevent the edible substance from escaping the first compartment 2200 until the utensil head housing 2500 is removed. In the illustrated embodiment, the utensil head housing 2500 is removed by tearing the layers along a pair of cut-outs 2600 disposed on opposing lateral sides 2110, 2115 between the container housing 2100 and the utensil head housing 2500. The second seal 2710 comprises opposing ends that are disposed on a first side of the cutouts 2600 and taper to an apex end 2720 disposed on a second side of the cutouts 2600, such that an opening is formed in the first compartment when the utensil head housing 2500 is removed causing the apex end 2720 to be unsealed.

In alternate embodiments, the utensil head housing is separable from the container housing in any suitable manner including but not limited to: tearing one or more layers, puncturing one or more layers, peeling one or more layers away from another layer, sliding one or more layers away from another layer, or any other mechanism that is configured to expose the utensil and open the first compartment of the container housing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container for consumable substances with integrated utensil, comprising:
    a container housing forming a first compartment and a second compartment disposed in a generally stacked configuration;
    wherein the first compartment is adapted to store an edible substance;
    a utensil housed within the second compartment, wherein the utensil extends past an end of the container housing and is enclosed by a utensil head housing;
    wherein the first compartment and the second compartment are distinct and sealed from one another, such that the edible substance does not flow between compartments;
    wherein the utensil comprises a head and a handle, the head configured to receive the edible substance, and the handle configured to remain within the second compartment during use;
    wherein the utensil head is aligned with an outlet of the first compartment such that the utensil head is configured to receive the edible substance upon opening of the first compartment;
    wherein the utensil head housing is coupled to the container housing such that removal of the utensil head housing simultaneously causes the first compartment to open and the utensil head to be revealed.

2. The container of claim 1, wherein the container housing comprises a first layer, a second layer, and a third layer, wherein the first layer and second layer form the first compartment and the second layer and third layer form the second compartment.

3. The container of claim 2, wherein an exterior perimeter of the first, second and third layers are substantially coplanar.

4. The container of claim 2, wherein the first, second and third layers each comprise a rectangular shaped second end and a tapered first end.

5. The container of claim 4, wherein the tapered first end of the third layer is blunt, terminating in a linear edge that is parallel to an edge of the second end of the first, second, and third layers.

6. The container of claim 4, wherein the tapered first end of the first layer terminates in a circular tab and the tapered first end of the second layer terminates in a point aligned within the circular tab.

7. The container of claim 4, wherein the first layer and third layer each form an exterior side of the container housing and the second layer extends through an interior volume of the container housing that separates the first compartment from the second compartment.

8. The container of claim 4, wherein the first, second, and third layers each comprises a same width, wherein the width is measured as the distance between a pair of lateral sides of the container housing.

9. The container of claim 1, wherein the container housing is composed of material configured to be heat-sealed to form the first compartment and the second compartment.

10. The container of claim 1, wherein the first compartment of the container housing is sealed along opposing lateral sides and a second end thereof, wherein an opposing first end of the first compartment defines an outlet configured to allow the edible substance to dispense directly onto the utensil head.

11. The container of claim 10, wherein the second compartment of the container housing is sealed along opposing lateral sides and a second end thereof, and includes an opening at a first end through which the utensil head extends.

12. The container of claim 1, wherein the utensil is fixed within the second compartment such that it is not removable from the second compartment during dispensing of the edible substance.

13. The container of claim 1, wherein a portion of the handle of the utensil extends and remains within the second compartment upon separation of the utensil head housing from the container housing.

14. The container of claim 1, wherein the utensil head housing comprises a clam-shell shape having a first side and a second side configured to fold around the utensil head and a tapered first end of the first compartment and the second compartment.

15. The container of claim 14, further comprising a lift tab extending from the first side of the utensil head housing, wherein the utensil head housing is configured to separate from the container housing by the lift tab that unseals the first compartment and separates the utensil head housing from the head of the utensil.

16. The container of claim 14, wherein the first compartment, second compartment, and utensil head housing are sealed along a perimeter to secure the utensil head housing to the first end of the first compartment and the second compartment.

17. The container of claim 1, wherein the first compartment comprises an interior volume configured to receive multiple servings of the edible substance.

18. The container of claim 1, wherein the first compartment comprises an interior volume configured to receive only a single serving of the edible substance.

19. The container of claim 1, wherein the utensil head is concave and configured to receive semi-solid or liquid edible substances without removal from the container housing.

* * * * *